United States Patent [19]

Fischbeck, Kenneth Henry

[11] 3,925,790

[45] Dec. 9, 1975

[54] IMAGE GENERATOR HAVING A PLURALITY OF MARKER UNITS OPERATED IN A PREDETERMINED SEQUENCE TO INHIBIT THE FORMATION OF PATTERNS

[75] Inventor: Kenneth Henry Fischbeck, Princeton, N.J.

[73] Assignee: RCA Corporation, New York, N.Y.

[22] Filed: Apr. 25, 1974

[21] Appl. No.: 463,996

[52] U.S. Cl............ 346/140; 101/DIG. 13; 197/1 R

[51] Int. Cl.$^2$.......................................... G01D 15/18

[58] Field of Search.......... 197/1 R; 101/1, DIG. 13; 346/75, 140

[56] References Cited

UNITED STATES PATENTS

| | | | |
|---|---|---|---|
| 3,375,528 | 3/1968 | Klavsons et al. | 346/140 |
| 3,404,221 | 10/1968 | Loughren | 346/75 X |
| 3,564,120 | 2/1971 | Taylor | 346/75 X |
| 3,769,631 | 10/1973 | Hill et al. | 346/75 |
| 3,823,409 | 7/1974 | Carrell | 346/140 |

*Primary Examiner*—Clifford D. Crowder
*Assistant Examiner*—Paul J. Hirsch
*Attorney, Agent, or Firm*—R. E. Smiley; E. J. Norton

[57] ABSTRACT

A non-impact printing apparatus including a disc having marker units located at the periphery of the disc. The marker units are operated in response to a control signal to mark picture elements of an output copy guided past an arcuate portion of the periphery of the disc. The printing apparatus includes a data demultiplexer to selectively couple the control signals to the marker units according to a predetermined sequence wherein adjacent picture elements of the output copy are not printed by the same marking unit to thereby prevent the formation of linear patterns readily perceptable to the human eye.

7 Claims, 3 Drawing Figures

IMAGE GENERATOR HAVING A PLURALITY OF MARKER UNITS OPERATED IN A PREDETERMINED SEQUENCE TO INHIBIT THE FORMATION OF PATTERNS

CROSS REFERENCE TO RELATED APPLICATIONS

Of interest is the following copending patent application: Ser. No. 414,756, filed on Nov. 12, 1973, now U.S. Pat. No. 3,864,696, by the same inventor as the present inventor and assigned to the same assignee as the present assignee.

BACKGROUND OF THE INVENTION

1. Field of the Invention

This invention pertains to the field of non-impact printing apparatus and in particular pertains to non-impact printing apparatus of the type wherein an array of marker units and a recording medium are in relative motion with respect to each other and selected ones of the marker units are operated to mark picture elements of the recording medium to produce an output copy.

2. Prior Art

There are known in the printing art a variety of non-impact marker units which operate in response to control signals to mark selected portions of a recording medium. The control signals may be modulated to produce images having two-tones, for instance, black and white, or images having a spectrum of tonal gradations. The marker units may be a light source, such as a laser, which is modulated to mark a photosensitive material, a heater element modulated to mark a thermosensitive material, an electrode modulated to mark an electrosensitive material, an ink depositing device, such as an ink stylus or ink jet, modulated to mark ordinary paper or any other suitable non-impact marking units operable in response to control signals.

Also known in the printing art are printing apparatus of the type wherein non-impact marker units are arranged to linear arrays and are selectively operated to mark respective incremental portions of the recording medium, known as picture elements in the art. As is known in the art, an output copy may be represented as a rectangular array including rows and columns of picture elements. In this type of printing apparatus, the array may remain fixed, while the recording medium is moved past the array of, conversely, the recording medium may remain fixed while the array is moved past the recording medium. Thus, in this type of printing apparatus an individual marker unit marks a respective picture element in the same position (column) in each successive line (row) of an output copy. An example of this type of printing apparatus is described in U.S. Pat. No. 3,560,988, FIG. 1 thereof, entitled "High Speed Precision Placements of Liquid Drops," issued to K. P. Krick, on Feb. 2, 1971.

There are two problems associated with the above-described type of printing apparatus. First, the resolution achievable in this type of printing apparatus is limited by the closeness of the spacing between the marker units in the array. Secondly, if a marker unit malfunctions or is not closely matched to the other marker units in the array, the malfunction or mismatch produces an undesirable vertical line (column) in the output copy.

Repeated experiments involving human visual perception using television and printed images have shown that line patterns and more readily detected than are distributed patterns. That is, erroneously marked adjacent picture elements within an output copy will be readily detected by the human eye whereas erroneously marked picture elements within an output distributed throughout the output copy will substantially escape detection by the human eye.

It is clear, therefore, that there is a need in the printing art for a printing apparatus capable of generating high resolution output copy while preventing the formation of undesirable readily detected patterns of erroneously marked picture elements.

SUMMARY OF THE INVENTION

In accordance with the invention, a printing apparatus is provided having a plurality of substantially matched marking units, each operable in response to a control signal to mark a recording medium to print an output copy, and means for scanning the marking units consecutively along a scan line of the recording medium. The effect of any marking unit malfunction is distributed throughout the output copy at spaced intervals to inhibit the formation of patterns readily perceptable to the human eye by means for sequentially coupling the control signal, according to a predetermined sequence, to successive ones of the marking units as they scan along the scan line so that no marking unit is operated to mark adjacent picture elements in the scan line of the recording medium.

BRIEF DESCRIPTION OF THE DRAWING

The same reference numerals in the different figures refer to the same element.

DETAILED DESCRIPTION OF THE PREFERRED EMBODIMENT

Figure 1:
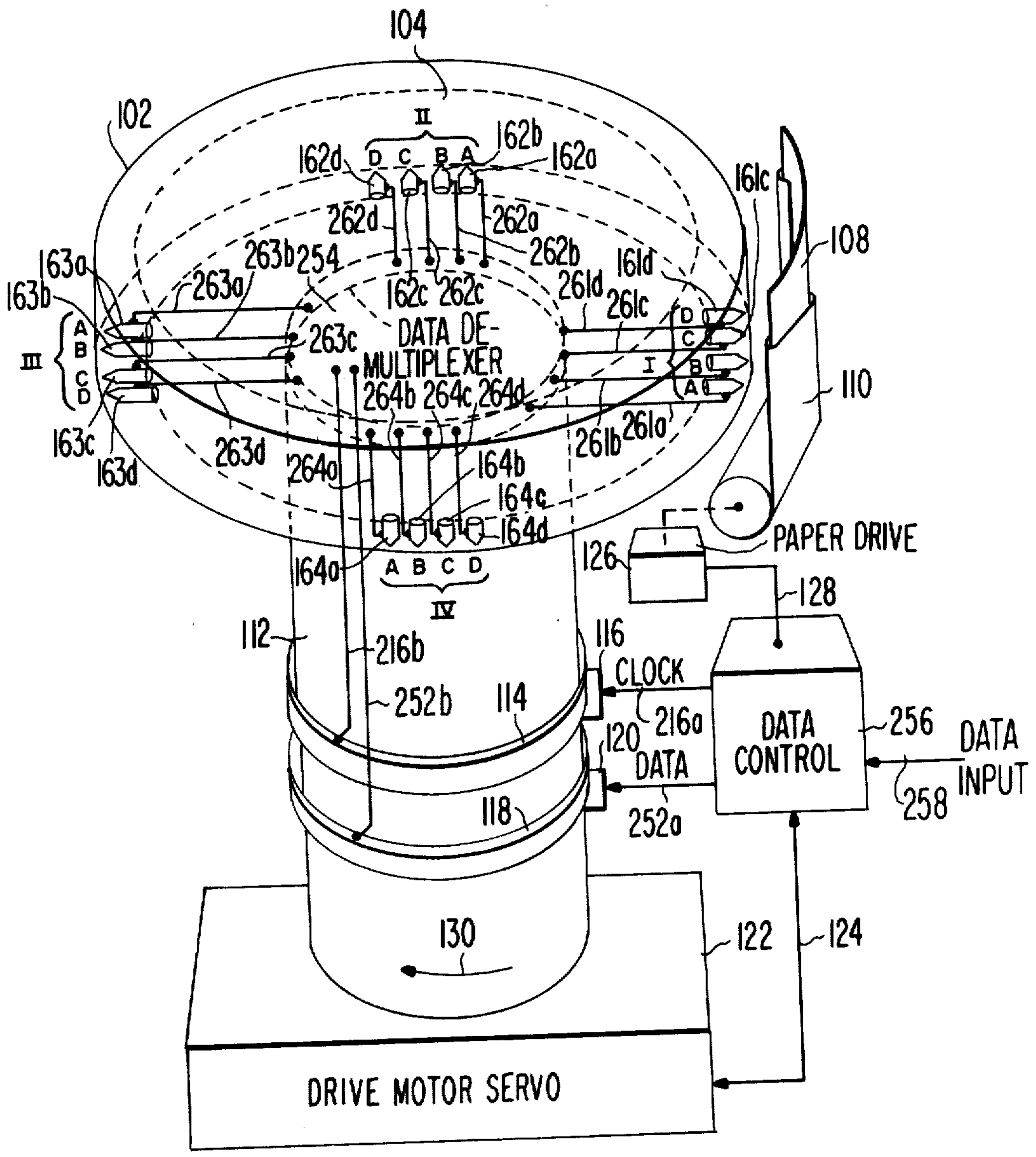
FIG. 1 is a combined isometric and block diagram of a preferred embodiment of the invention useful as a printing apparatus.

FIG. 1 is a combined isometric and block diagram of a printing apparatus embodying the invention. The printing apparatus of FIG. 1 is of the general type described in detail in a copending U.S. patent application, entitled "Printing Apparatus," having a Ser. No. of 414,756 and a filing date of Nov. 12, 1973, filed by the same inventor as the present inventor and assigned to the same assignee as the present assignee. The printing apparatus of FIG. 1, in accordance with a preferred form of the present invention, is provided with a plurality of marker units mounted at the periphery of a disc, arranged to be operated to mark a recording medium, guided past the periphery of the disc by a guide member, in response to control signals, manifesting printing information, conducted to the ink jets through respective conductors as the disc is rotationally driven.

In general, printing apparatus of the type shown in FIG. 1 have advantages over the prior art type of non-impact printing apparatus having a linear array of prior art marker units, described in the Prior Art section above, in that the resolution of the output copy of printing apparatus of the type shown in FIG. 1 is not limited by the relative closeness of the spacing between individual marker units. Specifically, each marker unit of printing apparatus of the type shown in FIG. 1 is swept or scans in a continuous manner across the entire length of a horizontal scan line of the recording medium. Thus, the critical conditions limiting the resolution of printing apparatus of the type shown in FIG. 1 is the speed at which the markers can be made to operate and the speed at which printing control information can be applied to the marker units in relation to the rotational speed of the disc supporting the marker units.

In FIG. 1, ink jets 161*a*–161*d*, 162*a*–162*d*, 163*a*–163*d* and 164*a*–164*d* (also designated for convenience, in each group, as A, B, C, and D) are respectively arranged in four groups I, II, III, and IV of four ink jets in each group along the periphery of disc 102. Ink jets 161*a*–161*d*, 162*a*–162*d*, 163*a*–163*d* and 164*a*–164*d* are of any type, well known in the art, which eject ink on demand in response to control signals. Groups I, II, III and IV are equidistant from one another, while the respective ink jets in each group I, II, III and IV are equidistant from and at a relatively proximate distance from one another. Cavity 104 extends substantially throughout disc 102 and is located generally radially inwardly from ink jets 161 through 164. Cavity 104 is adapted to serve as a reservoir for ink and communicates with each of the ink jets to supply ink to each. The ink jets are chosen to be closely matched in marking characteristics.

Disc 102 is mounted on shaft 112 to be rotationally driven by shaft 112, which in turn, is rotationally driven in the direction of arrow 130 by drive motor servo 122.

Control signals manifesting printing information are conducted to the respective ink jets of groups I–IV and by respective conductors 261*a*–261*d*, 262*a*–262*d*, 263*a*–263*d* and 264*a*–264*d* from data demultiplexer 254 to operate the ink jets to eject ink drops on recording medium 108.

Recording medium 108 is guided past an arcuate portion of the periphery of disc 102 by guide member 110.

It will be appreciated by those skilled in the art that ink jets may be replaced by any other suitable device for printing or marking picture elements of recording medium 108 as were previously enumerated.

As will be later explained in detail, the control signals generated by data demultiplexer 254, according to the invention, are selectively coupled to the ink jets according to a predetermined sequence wherein adjacent picture elements of the output copy, formed as the ink drops are impinged onto recording medium 108, are not printed by the same ink jet to inhibit the formation of patterns readily perceptable by the human eye.

Data demultiplexer 254 may be formed of any suitable circuit which is capable of dividing a signal conducted in one channel sequentially into a plurality of channels or locations in a predetermined manner. Circuits are well known in the communications, display and computer arts for selectively applying a signal to a particular device within an array of similar devices. For example, U.S. Pat. No. 3,564,135, entitled "Integrated Display Panel Utilizing Field-Effect Transistors," issued to Paul K. Weimer on Feb. 16, 1971, and assigned to the same assignee as the present assignee, discloses a display system including a rectangular array of light emitting elements supplied from a common power supply. All the elements in one row are connected to a row bus. All the elements in one column are connected to a column bus. A light emitting element is energized only to emit light when a suitable electrical signal is applied to the appropriate row bus and another suitable electrical signal is applied to the appropriate column bus. U.S. Pat. No. 3,355,721, entitled "Information Storage," issued to Joseph R. Burns on Nov. 23, 1967, and assigned to the same assignee as the present assignee, discloses a memory system including a rectangular array of storage devices connected to a common power supply and to respective row and column buses for storing binary information into selected storage elements within the array. These types of circuits are readily adapted by those skilled in the art to form data demultiplexer 254 to function in accordance with the present invention. One circuit, similar to the circuits disclosed in the above cited patents, forming data demultiplexer 254 is described with reference to FIG. 2, to be described.

A formatted data signal is conducted to data demultiplexer 254 from slip ring 118 through conductor 252*b*. This formatted data signal is coupled to slip ring 118 from data controller 256 through conductor 252*a* and brush 120. Similarly a clock signal is coupled to data demultiplexer 254 through the electrical path consisting of conductor 216*a*, brush 116, slip ring 114 and conductor 216*b*. It will be appreciated that respective pairs of slip rings 114 and 118 and brushes 116 and 120 may be replaced by any other suitable devices for commutating the clock and data signals to rotating shaft 112 such as electro-optical or electro-magnetic coupling devices.

Data controller 256 receives input data from a suitable source of data such as a telephonic data link, a cable television channel or computer controlled memory, through data channel 258. The input data manifests graphical information to be printed on recording medium 108 to form the output copy. As was previously described, the output copy may be considered to be formed by a rectangular array of picture elements. It will be understood, therefore, that the input data typically manifests graphical information such as the tone of each picture element and the boundaries of the rectangular array of picture element defining the margins of the output copy. The input data may have the form of blocks of sequential binary words, the block corresponding to the rows in the rectangular array of picture elements (the horizontal lines in the output copy) and the binary words manifesting the tone to be printed in respective picture elements of the row. For a two tone image, for instance black and white, the form of the input data is relatively simple and comprises blocks of bits rather than blocks of binary words, the blocks again corresponding to horizontal lines of the output copy and each bit manifesting one of the two tones to be printed in respective picture elements.

Data controller 256 stores the data in formatted form, including the blocks of sequential binary words, in the case of multi-tone printing, or sequential bits, in the case of two-tone printing, in a suitable memory device such as a storage register, not shown. For example, the formatted data for a two-tone image may be stored in a 1000 bit MOS (metal-oxide semiconductor) memory array wherein each of the 1000 bit positions correspond to a respective picture element of a horizontal line of the output copy. As a further example, the data may be stored in a register formed by a charge-coupled device (CCD) which is particularly useful in gray tone printing. The stored data is coupled to data demultiplexer 254 from the storage register through brush 120 and slip ring 118 responsive to the clock signal (conductor 216*a*) as will later be explained. The formulated data may be coupled to data demultiplexer 254 in parallel or in serial fashion. Serial transfer is preferred, however, since parallel transfer essentially requires a commutator for each transferred bit, whereas, serial transfer requires only one commutator.

Data controller 256 also generates and couples control signals, manifesting synchronization information, to paper drive 126 and drive motor servo unit 122, respectively, through control lines 128 and 124 to respectively synchronize the movement of paper past the periphery of disc 102 and to control the rotational speed of shaft 112 to the operation of the ink jets A, B, C, D of Groups I–IV. Drive motor servo unit 122 typically may include a suitable electric motor and a suitable servo circuit arranged to control the speed of shaft 112 in response to error signals as is well known in the art.

Paper drive 126 is mechanically coupled to a suitable source of recording medium such as a roll of paper as is shown in FIG. 1. After each line of the output copy is printed, the recording medium is advanced one line in response to a control signal conducted through control line 128 from data controller 256.

In operation, disc 102 is rotationally driven by shaft 112 to sweep the ink jets past recording medium 108. Each group of ink jets, I, II, III and IV, is sequentially swept past recording medium 108. When group I ink jets are swept past recording medium 108, ink jets 161*a*–161*d* are operated in a predetermined sequence in accordance with the invention, as will be explained, to impinge drops of ink within picture elements of the first horizontal line of recording medium 108 to print the first horizontal line of the output copy. Thereafter, recording medium 108 is advanced by paper drive 128 so that the second horizontal line of the output copy may be printed by the ink jets within group II. Similarly, group III ink jets print the third horizontal line of the output copy and group IV print the fourth horizontal line of the output copy. This sequential line printing is repeated until all the lines of the output copy are printed.

Although the ink jets or other suitable markers on the periphery of disc 102 are chosen to be closely matched in marking characteristics as previously explained, it is, in practice, impossible to perfectly match the markers. The flaws in matching marking characteristics are readily perceptable since a linear pattern is formed if adjacent picture elements are marked by the same marker. When a particular marker malfunctions or completely fails to operate, the linear pattern is particularly noticeable since an entire line may be completely blank, in the worst case. As is well known in the art, ink jets of the type that generate ink drops on demand frequently malfunction since such types of ink jets are susceptible to the development or occurrence of air bubbles resulting from the intake of air after a drop of ink has been ejected. Accordingly, the respective ink jets of each group are sequentially operated, in accordance with the invention, so that no two adjacent picture elements are printed or marked by the same ink jet.

Sequential picture elements in a particular line may be identified by respective integers in the sequence of integers from the 0th through the *n*th position where *n* is the identifying integer for the last picture element in the line, and "0" is the first picture element. In one suitable sequence of operating ink jets 161*a*–161*d*, 162*a*–162*d*, 163*a*–163*d*, and 164*a*–164*d*, according to the invention, every ink jet within a group of ink jets marks every 4th picture element. Thus, the A ink jet in a group is operated to mark the 3rd, 7th, 11th, 15th, etc. picture element, the B ink jet in the group is operated to mark the 2nd, 6th, 10th, 14th, etc. picture element, the C ink jet in the group is operated to mark the 1st, 5th, 9th, 13th etc. picture element and the D ink jet in the group is operated to mark the 0th, 4th, 8th, 12th, etc. picture element. After the completion of this line, the next group of ink jets to be swept past the recording medium will be sequentially operated in a similar fashion to print the next line of the output copy. Thus, the marks produced by a mismatched or malfunctioning ink jet are not adjacent in either the horizontal or vertical direction and are distributed throughout the entire output copy and thereby do not form a linear pattern readily perceptable to the human eye.

Data demultiplexer 254 receives the formated data from data controller 256 and is arranged to generate control signals to operate the respective ink jets to mark the picture elements of the output copy, in accordance with the invention, in a predetermined sequence wherein no adjacent picture elements in a line are marked by the same ink jet within a group of ink jets and no adjacent lines are marked by the same group of ink jets.

As was previously explained, the data manifesting a two tone image may be a series of bits wherein the bits in the series manifest which one of the two tones is to be marked in a respective picture element. Therefore, in a two tone printing apparatus, data demultiplexer 254 may be arranged to generate and couple data consisting of a series of bits to the ink jets in a predetermined sequence, according to the invention, so that no two adjacent picture elements are marked by the same ink jet. In this arrangement an ink jet is adapted to eject a drop of ink in response to one binary level (for instance, a binary "1") and not to eject a jet of ink in response to the other binary level (for instance, a binary "0") respectively, to mark or not mark a picture element which it opposes.

In a multi-tone printing apparatus, as was previously described, the data manifesting the image may be a series of binary words wherein the binary words in the series manifest a tone in a range of tones. In this type of multi-tone printing apparatus the series of binary words is converted into a series of multi-level pulses by a D/A (digital to analogue) converter or the like. Accordingly, it should be understood that a multi-tone printing apparatus, data demultiplexer may be arranged to generate and couple data consisting of a series of multi-level pulses to ink jets in a predetermined sequence so that no two adjacent picture elements are marked by the same ink jet. According to such an arrangement, each ink jet is operated to eject a drop of ink whose size depends on the level of the pulse applied to the ink jet.

In another type of multi-tone printing apparatus the size of the drops of ink remain constant while the spacing between the drops corresponds to the tone manifested by a binary word. According to this type of printing apparatus data demultiplexer 254 may be arranged to control the location within a picture element at which an ink drop is ejected from the ink jet marking that picture element. The control of the position at which a drop impinges recording medium 108 within a picture element may be accomplished, for example, by providing suitable variable delay devices, whose delay is programmable in response to the binary word manifesting tonal information, in control lines 261*a*–261*d*, 262*a*–262*d*, 263*a*–263*d* and 264*a*–264*d*.

Figure 2:
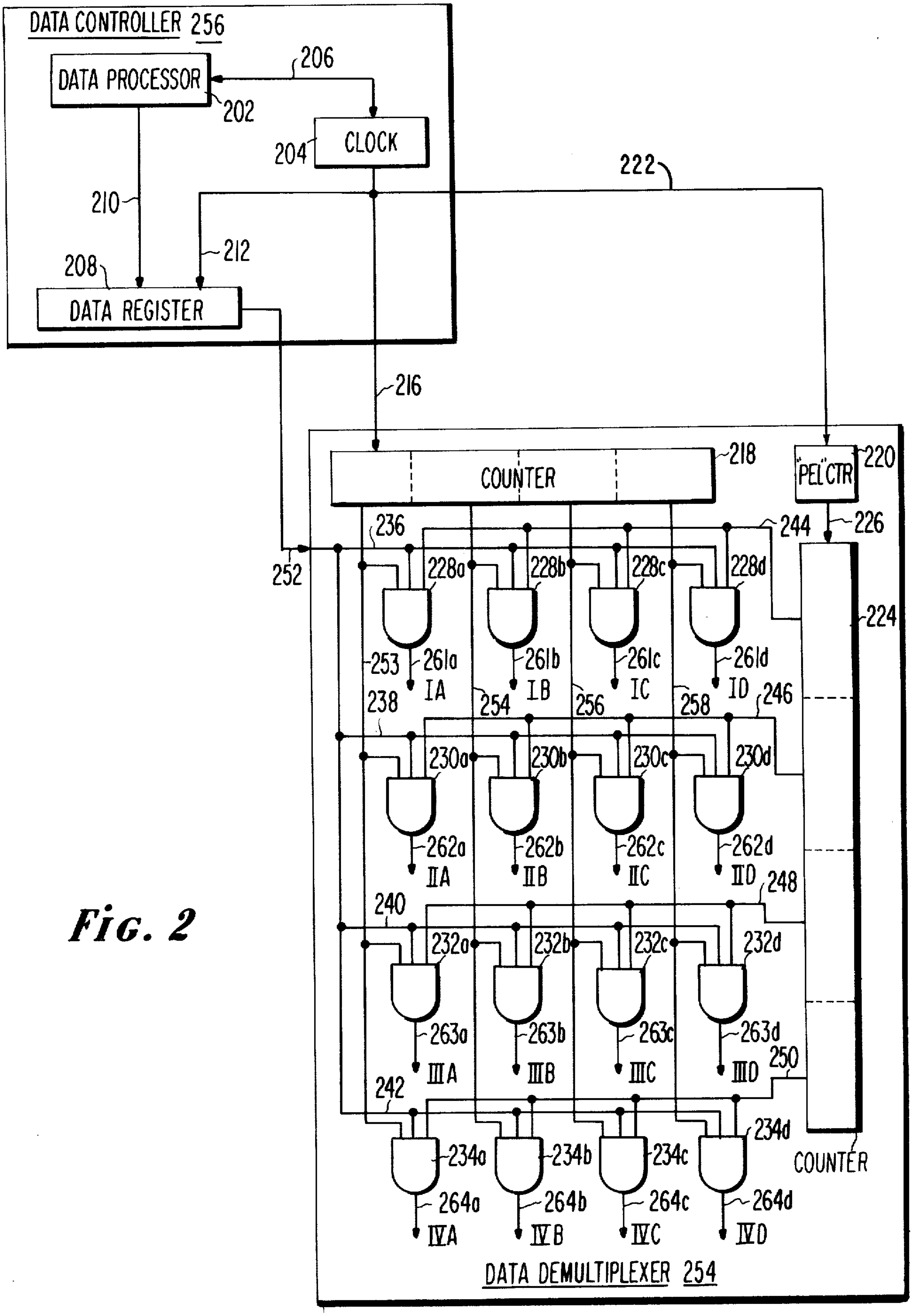
FIG. 2 is a logic diagram showing the logic implementations of certain functional blocks of FIG. 1.
Figure 3:
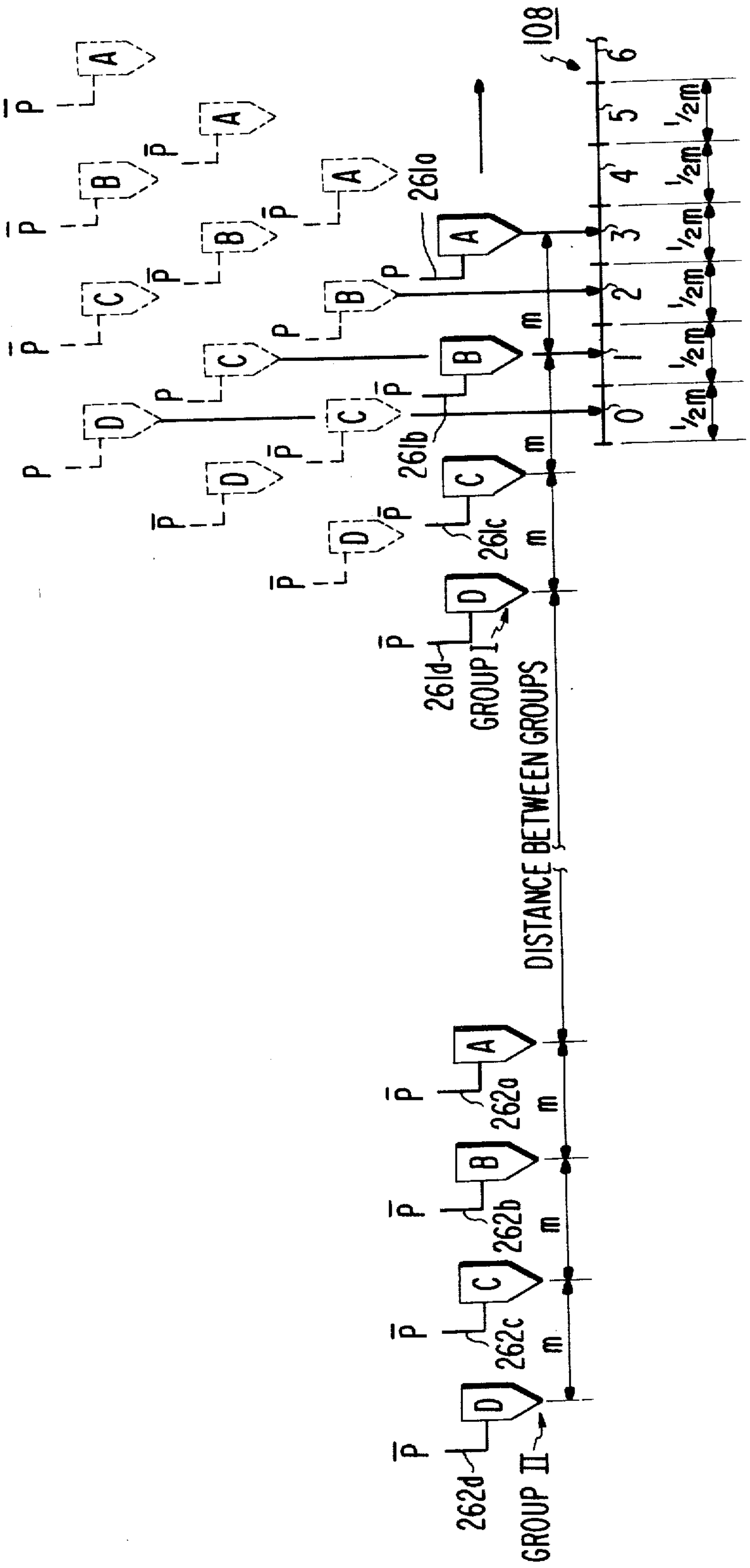
FIG. 3 is a timing diagram useful in understanding the operation of FIG. 1 and FIG. 2.

FIG. 2 is a logic diagram illustrating an implementation of a data demultiplexer 254 for controlling the operation of ink jets 161a–161d, 162a–162d, 163a–163d and 164a–164d in the specific sequence previously described and the spacing designated in FIG. 3 between adjacent ink jets (nozzles) in a group is twice the spacing between the centers of adjacent picture elements (see FIG. 3). As shown, data demultiplexer 254 of FIG. 2 is arranged to generate control signals to control the operation of ink jets to generate a two-tone image. However, it will be appreciated by those skilled in the art that data demultiplexer 254 of FIG. 2 may be arranged to generate control signals to control the operation of ink jets to generate a multi-tone image by providing suitable devices to modulate the size or spacing of the ink drops generated by ink jets 161a–161d 162a–162d, 163a–163d and 164a–164d in response to binary words manifesting tonal information in control lines 261 a–261d, 262a–262d, 263a–263d and 264a–264d.

A suitable data processor 202 of data controller 256 receives data from data channel 258. Data processor 202 may be formed of any of the well known circuits available in the art for decoding and formatting digital signals. The data in data channel 258 is encoded in any suitable form for transmission through a data channel such as FSK (frequency shift keying) or the like. Data processor 202 decodes the input data as it is received from data channel 258 and couples the decoded data to data register 208 through conductor 210. As previously described, data manifesting tonal information for a line is generally formatted in a block of sequential bits for two-tone printing and in a block of sequential binary words for multi-tone printing. Data register 208, in general, is thus provided with a number of suitable digital storage cells, such as flip-flops, to store a block of bits or binary words manifesting a line to be printed. In the data controller of FIG. 2, arranged for use within a two tone printing apparatus, data register 208 contains a number of storage cells equal to the number of picture elements in a line to store the bits manifesting information as to which one of the two tones is to be marked in respective picture elements. For the requirements, in practice, of data storage registers containing over 1000 storage cells state-of-the-art MOS registers may be used as such a suitable register.

It should be noted that in the specific embodiment of FIG. 2, if it is desired that the A ink jet print the 3rd, 7th, 11th, 15th, etc. picture element, the B ink jet print the 2nd, 6th, 10th, 14th, etc. element, the C ink jet print the 1st, 5th, 9th, 13th, etc. picture element, and the D ink jet print the 0th, 4th, 8th, 12th, etc. picture element, data register 208 should be arranged to provide the bits (or words) manifesting the times of the picture element to be printed in the sequence 3, 2, 1, 0, 7, 6, 5, 4, 11, 10, 9, 8, etc. since picture elements comprising groups of four, in essence, are printed in reverse order, providing also that the spacing between adjacent ink jets (nozzles) in a group is no greater than twice the spacing between the centers of adjacent picture elements.

Clock oscillator 204 of know form is coupled to processor 202 through conductor 206, data register 208 through conductor 212 and counter 218 of data demultiplexer 254 through path 216 (including brush 116 and slip ring 114) to clock the transfer of data. The frequency of clock oscillator 204 is suitably selected in relation to the rotational speed of disc 102 and the desired resolution (that is, picture elements spacing) to time the operation of the ink jets A–D.

Data demultiplexer 254 is arranged into a rectangular array of AND gates 228a–228d, 230a–230d, 232a–232d and 234a–234d, ring counters 218 and 224 and counter 220. As was previously described, the specific arrangement of data demultiplexer 254 is an adaptation of a type of circuit well known in the art wherein elements of a rectangular array of elements may be selectively energized by applying control signals to appropriate row and column buses coupled to the selected element. Other arrangements will be apparent to those skilled in this art.

The outputs of AND gates 228a–228d, 230a–230d, 232a–232d and 234a–234d are respectively coupled to ink jets 161a–161d, 162a–162d, 163a–163d, and 164a–164d, through respective conductors 261a–261d, 262a–262d, 263a–263d and 264a–264d. Each AND gate within the rectangular array of AND gates has three inputs. A first input of each AND gate is connected to the output of data register 208 through conductor 252.

Ring counter 218 is a suitable four-stage ring counter of known form. As is well known in the art, a ring counter is a data register, including a number of storage cells or stages connected in cascade to form a closed loop wherein a single bit, such as a binary 1, circulates through the ring counter as the bit is sequentially shifted from one storage cell to another in response to a clock signal. The output of clock oscillator 204 is coupled to the clock input of ring counter 218 to shift the binary 1 between stages of ring counter 218. The output of each stage of ring counter 218 is connected to a second input of all the AND gates in a respective column of the rectangular array of AND gates by respective column buses 253, 254, 256, and 258.

Ring counter 224 is similar to ring counter 218. The output of each of the four stages of ring counter 224 is coupled to a third input of all the AND gates in a respective row of the rectangular array of AND gates by respective row buses 244, 246, 248 and 250.

The output of clock oscillator 204 is coupled to counter 220 through conductor 222. Counter 220 is a binary counter adapted to count to the number of picture elements ("PEL") in a line and then be reset to 0 in response to clock pulses from clock oscillator 204. The output of counter 220 is connected to the clock input of ring counter 224 so that the binary 1 within ring counter 224 is sequentially shifted between successive stages of ring counter 224 each time counter 220 reaches a count of 0.

The following is a description of the operation of the logic of FIG. 2 to control the operation of ink jets 161a–161d, 162a–162d, 163a–163d, and 164a–164d of the printing apparatus of FIG. 1 so that each ink jet in a group prints in the specific sequence previously described. In the following description concurrent reference to FIGS. 1, 2 and 3 will be helpful. FIG. 3 is a timing diagram showing the sequential operation of the ink jets on disc 102.

Initially, ring counter 218 is preset (through connections not shown) so that a binary 1 is in the leftmost stage of ring counter 218, counter 220 is preset (through connections not shown) to a count of 0 and ring counter 224 is preset (through connections not shown) so that a binary 1 is in the topmost stage of ring counter 224. When data register 208 is filed with data manifesting image information for the first line of the output copy, processor 202 initiates the operation of clock 204 by transmitting a suitable enable signal to clock 204 through control line 206. It should be noted that by this time the rotational speed and position of disc 102 has been synchronized with the incoming data by data controller 256 so that the ink jets of group I are in position to begin to print the first line of the output copy.

Clock pulses from clock 204 cause the rightmost bit of data register 208 to be coupled to a first input of each AND gate 228*a*–228*d*, 230*a*–230*d*, 232*a*–232*d*, and 234*a*–234*d* in the rectangular array of AND gates. Clock pulses from clock 204 also cause the binary 1 in ring counter 218 to be circulated toward the right. As the binary 1 in ring counter 218 is shifted between consecutive stages of ring counter 218, a binary 1 is consecutively coupled to a second input of each AND gate 228*a*, 228*b*, 228*c* in the first row of rectangular AND gates. Only when all the inputs of an AND gate are at a binary 1 is the output of the AND gate at a binary 1. Therefore, if the data bit from data register 208, coupled to the first input of each AND gate, is a binary 1 and a binary 1 is coupled to the second input of an AND gate in the first row of AND gates from ring counter 218, the output of that AND gate will be a binary 1 since a binary 1 is coupled to the third input of each AND gate in the first row of AND gates from the topmost stage of ring counter 224. Only a binary 1 at an output of a respective AND gate within the rectangular array of AND gates will cause a respective ink jet on disc 102 to eject a drop of ink.

In FIG. 3 a P manifests the occurrence of three binary 1's at the inputs of an AND gate causing a respective ink jet to eject a drop of ink onto a picture element 109, whereas, a P manifests the non-occurrence of three binary 1's at the inputs of an AND gate prohibiting the ejection of a drop of ink from the respective ink jet. The binary 1 in ring counter 218 is circulated in ring counter 218 until an entire line is printed and then set into the leftmost stage. Thus, ink jets 161*a*–161*d* are sequentially operated so that every ink jet marks every 4th picture element in the first line of the output copy.

After all of data manifesting the first line of data has been shifted out of data register 208 in response to clock pulses from clock oscillator 204, the count in counter 220 has reached a count equal to the number of picture elements in a line and is therefore reset to 0. A 0 count in counter 220 causes the binary 1 in ring counter 224 to shift downward to the next successive stage. Thus, a binary 1 is coupled to a first input of each AND gate 230*a*–230*d* in the second row of AND gates. As the binary 1 in ring counter 218 is circulated, a binary 1 is sequentially applied to the second input of AND gates 230*a*–230*d*. Thus, each ink jet in Group II is sequentially operated to mark every fourth picture element in the second line of the output copy.

The ink jets in Groups II and IV are consecutively operated in the same manner as was previously described for the ink jets in Groups I and II to print respectively the third and fourth lines of the output copy. The binary 1 in ring counter 224 is circulated in ring counter 254 until an entire page has been printed and then set into the topmost stage.

It should be appreciated that although the invention has been described in terms of a particular sequence wherein a marker unit marks every 4th picture element in a line, there are many other suitable sequences, as will be apparent to those skilled in the art. It should further be appreciated that although for the specific logic embodiment of FIG. 2, a specific relationship between the spacing of ink jets and the spacing of picture elements was recited, in general, the invention is not limited or restricted to such spacing relationships. In practice, the spacing between adjacent ink jets may range for a value less than the spacing between adjacent picture elements to a value many times such spacing. It should be appreciated that for such variations suitable modification of the logic illustrated in FIG. 2 will be required to provide for storing and sequencing the data signals to control the operation of the jets. It should also be appreciated that the ink jets need not be divided into groups. That is, for instance, ink jets 161*a*–161*d*, 162*a*–162*d*, 163*a*–163*d* and 164*a*– 164*d*, may be distributed uniformly along the entire periphery of disc 102. Further, it will be appreciated that the number of ink jets per group and the total number of ink jets described is by way of example only. The number of ink jets will be sized to suit the desired application.

What is claimed is:

1. A printing apparatus for marking picture elements along a line of a recording medium comprising:

a plurality of substantially matched marking units, each of said marking units being operable in response to a control signal manifesting tonal information to mark said recording medium, marks made by each of said marking units being normally substantially indistinguishable from marks made by the other marking units, at least one of said marking units being subject to malfunction; and means for sequentially coupling said control signals to successive ones of said marking units in accordance with a predetermined sequence wherein no marking unit marks adjacent picture elements in said line whereby the marks of any malfunctioning marking unit are distributed at spaced intervals along said line.

2. An apparatus according to claim 1, further comprising:

a support member upon which said marking units are mounted;

means for guiding said recording medium past said support member; and means for providing relative motion between said support member and said recording medium to scan said marking units consecutively along a line of said recording medium, said picture elements being disposed along said line.

3. The apparatus recited in claim 2 wherein said support member is a disc; said marking units are mounted at said periphery of said disc; said guiding means guides said recording medium past an arcuate portion of said disc; and said means for providing relative motion between said support member and said recording means includes means for rotationally driving said disc.

4. The apparatus recited in claim 3 wherein said marking units are ink jets.

5. A printing apparatus for marking a succession of picture elements comprising:

a disc including a cavity substantially through said disc and adapted to serve as a reservoir for ink;

a guide member for guiding a recording medium past an arcuate portion of said disc;

a predetermined number of substantially matched ink jets mounted at the periphery of said disc and directed radially outward, adjacent ones of said ink jets being separated by a predetermined distance, each of said ink jets communicating with said reservoir to be supplied with ink from said reservoir, each of said ink jets being operable in response to a control signal manifesting tonal information to eject a drop of ink onto said recording medium;

means for rotationally driving said disc to consecutively scan said marking units along a line of said recording medium; and means for sequentially coupling said control signals to successive ones of said ink jets in accordance with a predetermined sequence wherein no ink jet marks adjacent picture elements in said line whereby any ink jet malfunction is distributed at spaced intervals along said line.

6. The printing apparatus according to claim 5 wherein said ink jets are arranged in groups spaced at uniform intervals from one another along said periphery.

7. The printing apparatus according to claim 6 including means for sequentially operating said groups to print successive lines, respectively.

* * * * *